US012665896B2

(12) United States Patent
Driscoll et al.

(10) Patent No.: US 12,665,896 B2
(45) Date of Patent: Jun. 23, 2026

(54) ELECTRICITY METER AND SYSTEM HARDENED AGAINST ATTACK VECTORS

(71) Applicant: Itron, Inc., Liberty Lake, WA (US)

(72) Inventors: Timothy James Driscoll, Raleigh, NC (US); Jeffrey Scott Bailey, Coeur dAlene, ID (US); Christopher Higgins, Wake Forest, NC (US)

(73) Assignee: Itron, Inc., Liberty Lake, WA (US)

( * ) Notice: Subject to any disclaimer, the term of this patent is extended or adjusted under 35 U.S.C. 154(b) by 267 days.

(21) Appl. No.: 18/375,947

(22) Filed: Oct. 2, 2023

(65) Prior Publication Data

US 2024/0267368 A1 Aug. 8, 2024

Related U.S. Application Data

(60) Provisional application No. 63/443,308, filed on Feb. 3, 2023.

(51) Int. Cl.
| | |
|---|---|
| *H04L 29/06* | (2006.01) |
| *H04L 9/32* | (2006.01) |
| *H04L 9/40* | (2022.01) |

(52) U.S. Cl.
CPC ........ *H04L 63/0823* (2013.01); *H04L 9/3271* (2013.01); *H04L 63/064* (2013.01)

(58) Field of Classification Search
CPC .. H04L 63/0823; H04L 63/064; H04L 9/3271
See application file for complete search history.

(56) References Cited

U.S. PATENT DOCUMENTS

| | | | | |
|---|---|---|---|---|
| 11,336,635 B2 * | 5/2022 | Park | ........................ | H04W 4/70 |
| 2005/0075986 A1 * | 4/2005 | You | ........................ | H04L 9/3263 |
| | | | | 705/71 |

(Continued)

OTHER PUBLICATIONS

Zakaria El Mrabet et al., Deep Learning-Based Intrusion Detection System for Advanced Metering Infrastructure, Mar. 27, 2019, ACM, pp. 1-7. (Year: 2019).*

(Continued)

*Primary Examiner* — Luu T Pham
*Assistant Examiner* — Fahimeh Mohammadi
(74) *Attorney, Agent, or Firm* — Lee & Hayes, P.C.

(57) ABSTRACT

An electricity meter and electricity system or grid that is hardened against attack vectors is described, and provided in part by automated multiple-factor authentication over multiple communication networks. In an example, a utility company may control an advanced metering infrastructure (AMI) network to provide internal communications. Metering devices may utilize customer's Wi-Fi to gain access to the internet, allowing electricity consumption data to be transmitted over the internet. Multiple authentication factors are used to prevent a bad actor from impersonating the metering device or cloud server. In an example, each metering device determines a secret, and sends the secret over the AMI network to a utility company server, and which relays the secret to the cloud server. The cloud server uses the secret to establish trust with metering devices. Additionally, the metering devices and the cloud server have signed certificates, which are used in additional authentication processes.

12 Claims, 7 Drawing Sheets

(56) References Cited

U.S. PATENT DOCUMENTS

| | | | | |
|---|---|---|---|---|
| 2005/0086514 | A1* | 4/2005 | Han | H04L 63/0823 726/26 |
| 2010/0241848 | A1 | 9/2010 | Smith | |
| 2012/0137126 | A1* | 5/2012 | Matsuoka | H04L 9/0838 713/156 |
| 2012/0224695 | A1* | 9/2012 | Hashimoto | H04L 9/0894 380/279 |
| 2014/0375474 | A1* | 12/2014 | Dietrich | H04L 9/3273 340/870.02 |
| 2018/0109047 | A1 | 4/2018 | Hoang et al. | |
| 2018/0337783 | A1* | 11/2018 | Lu | H04L 63/083 |
| 2019/0386981 | A1* | 12/2019 | Ramesh Kumar | H04L 9/3228 |
| 2020/0007325 | A1* | 1/2020 | Jain | H04L 63/0853 |
| 2020/0076891 | A1* | 3/2020 | Stuart | H04L 63/12 |
| 2020/0314072 | A1* | 10/2020 | Barnett | H04L 63/08 |
| 2020/0366667 | A1* | 11/2020 | Cebe | H04L 9/302 |
| 2021/0058256 | A1* | 2/2021 | Nishimura | G06F 21/335 |
| 2022/0021521 | A1* | 1/2022 | Shamai | G06Q 20/3676 |
| 2022/0131712 | A1* | 4/2022 | Gorsica | G06F 21/606 |
| 2022/0191191 | A1* | 6/2022 | Brockhaus | H04L 63/0838 |
| 2023/0146229 | A1* | 5/2023 | Igarashi | H04L 9/50 713/153 |

OTHER PUBLICATIONS

Muhammad Qasim Ali et al., Randomization-Based Intrusion Detection System for Advanced Metering Infrastructure, Dec. 9, 2015, ACM, vol. 18, Issue 2, Article No. 7, pp. 1-30. (Year: 2015).*

Shaik Mullapathi Farooq et al., Using ID-Based Authentication and Key Agreement Mechanism for Securing Communication in Advanced Metering Infrastructure, Nov. 17, 2020, IEEE, vol. 8, pp. 210503-210512. (Year: 2020).*

Sungwook Kim et al., A Secure Smart-Metering Protocol Over Power-Line Communication, Oct. 2011, IEEE, vol. 26, Issue: 4, pp. 2370-2379. (Year: 2011).*

Extended European Search Report mailed Apr. 19, 2024 for European Application No. 24154969.0, a foreign counterpart to U.S. Appl. No. 18/375,947, 11 pages.

Kumar, et al, "LKM-AMI: A Lightweight Key Management Scheme for Secure two Way Communications between Smart Meters and HAN Devices of AMI System in Smart Grid", Peer-to-Peer Networking and Applications, vol. 14, No. 1, Aug. 22, 2020, pp. 82-100.

Sinnhofer, et al, "Patterns to establish a secure communication channel", Computational Biology and Bioinformatics, Jul. 6, 2016, pp. 1-21.

Yu, et al, "Lightweight Three-Factor-Based Privacy-Preserving Authentication Scheme for IoT-Enabled Smart Homes", IEEE Access, vol. 9, Sep. 9, 2021, pp. 126186-126197.

Office Action for Canadian Application No. 3,222,234, Dated Jan. 20, 2025, 4 pages.

Examination Report for Australian Application No. 2023282175, Dated Sep. 17, 2024, 4 pages.

Examination Report for Australian Application No. 2023282175, Dated Sep. 20, 2025, 3 pages.

Examination Report for European Application No. 24154969.0, Dated Sep. 12, 2025, 8 pages.

Examination Report for Australian Application No. 2023282175, Dated May 23, 2025, 3 pages.

* cited by examiner

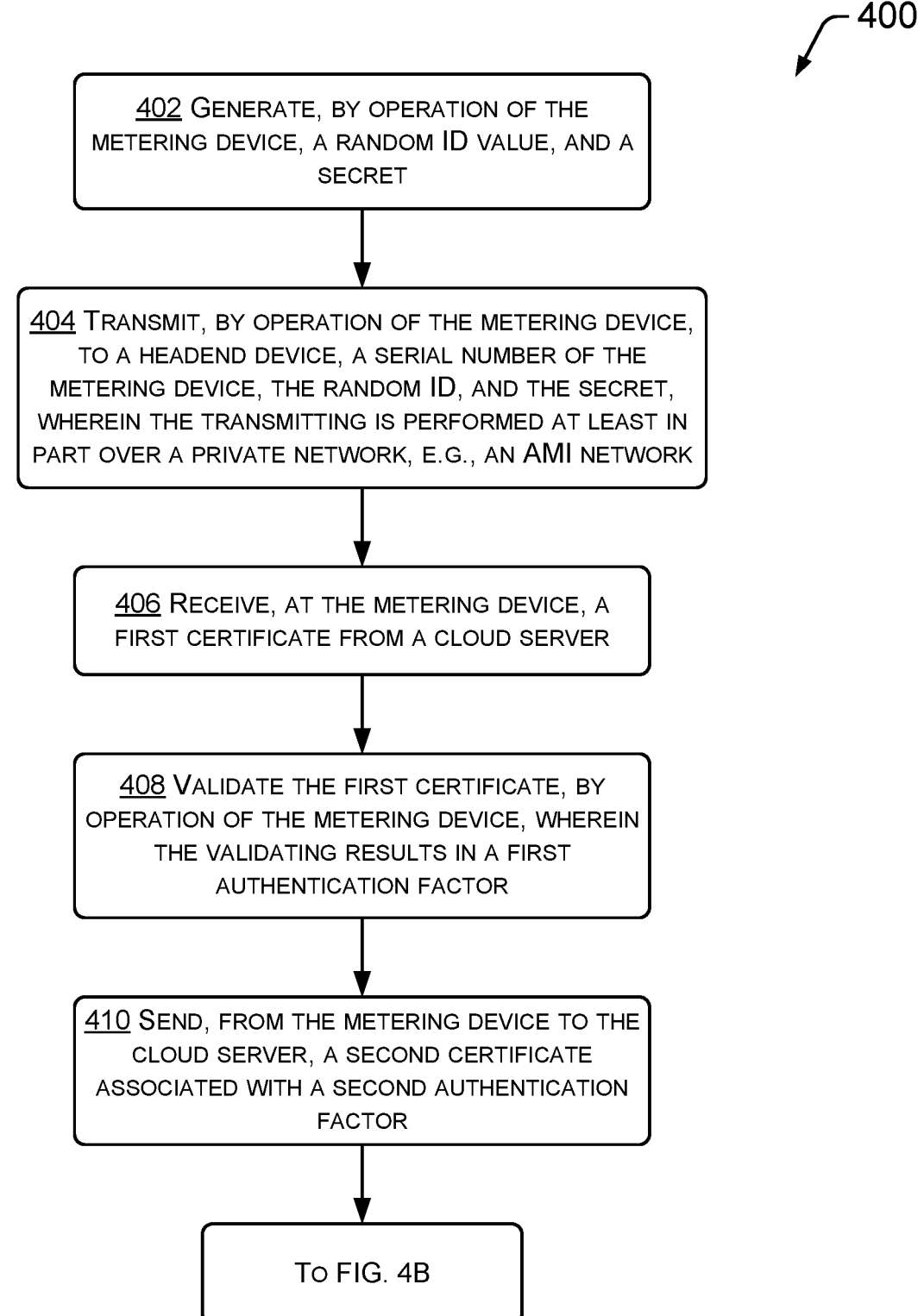

400

402 GENERATE, BY OPERATION OF THE METERING DEVICE, A RANDOM ID VALUE, AND A SECRET

404 TRANSMIT, BY OPERATION OF THE METERING DEVICE, TO A HEADEND DEVICE, A SERIAL NUMBER OF THE METERING DEVICE, THE RANDOM ID, AND THE SECRET, WHEREIN THE TRANSMITTING IS PERFORMED AT LEAST IN PART OVER A PRIVATE NETWORK, E.G., AN AMI NETWORK

406 RECEIVE, AT THE METERING DEVICE, A FIRST CERTIFICATE FROM A CLOUD SERVER

408 VALIDATE THE FIRST CERTIFICATE, BY OPERATION OF THE METERING DEVICE, WHEREIN THE VALIDATING RESULTS IN A FIRST AUTHENTICATION FACTOR

410 SEND, FROM THE METERING DEVICE TO THE CLOUD SERVER, A SECOND CERTIFICATE ASSOCIATED WITH A SECOND AUTHENTICATION FACTOR

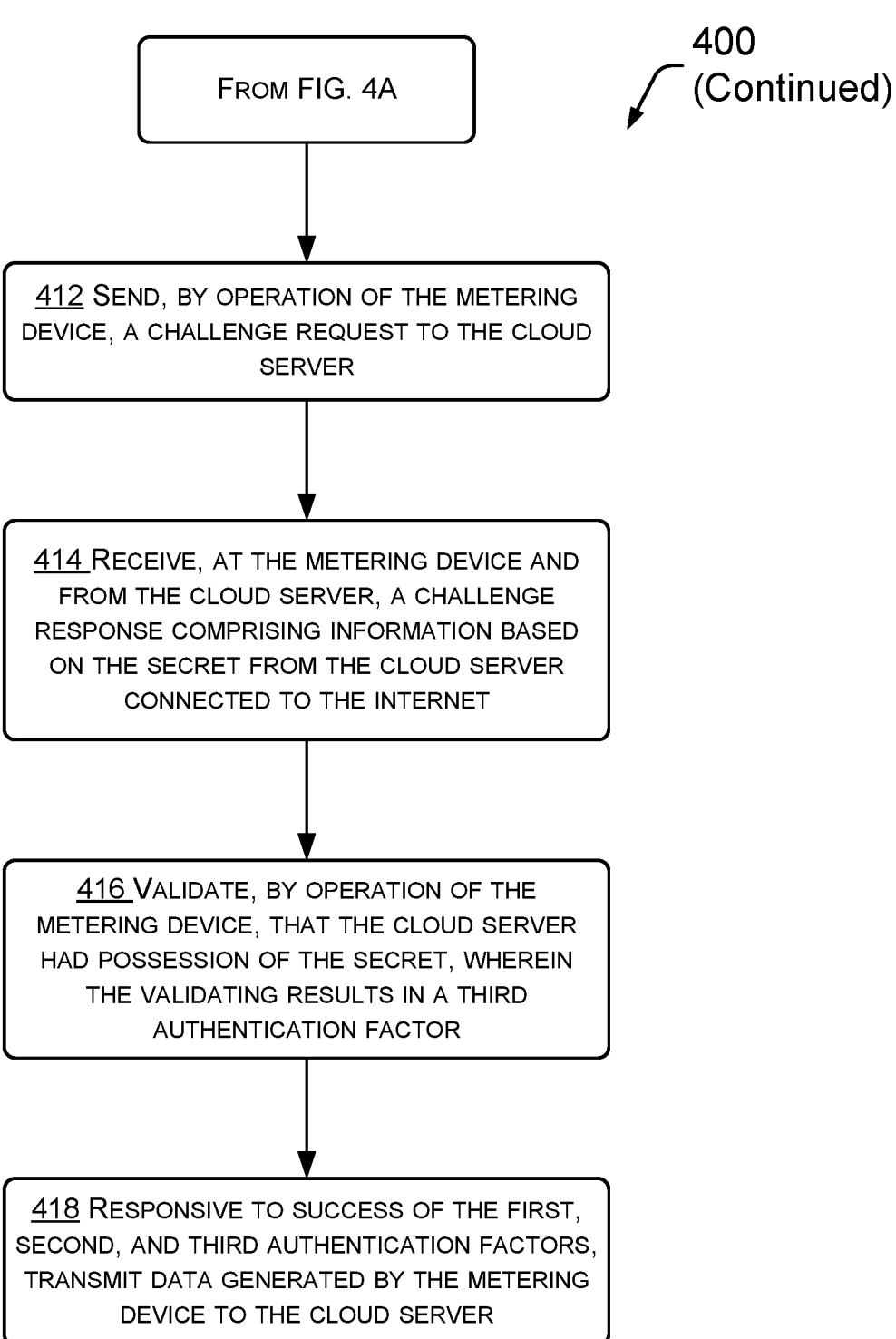

400
(Continued)

FROM FIG. 4A

412 SEND, BY OPERATION OF THE METERING DEVICE, A CHALLENGE REQUEST TO THE CLOUD SERVER

414 RECEIVE, AT THE METERING DEVICE AND FROM THE CLOUD SERVER, A CHALLENGE RESPONSE COMPRISING INFORMATION BASED ON THE SECRET FROM THE CLOUD SERVER CONNECTED TO THE INTERNET

416 VALIDATE, BY OPERATION OF THE METERING DEVICE, THAT THE CLOUD SERVER HAD POSSESSION OF THE SECRET, WHEREIN THE VALIDATING RESULTS IN A THIRD AUTHENTICATION FACTOR

418 RESPONSIVE TO SUCCESS OF THE FIRST, SECOND, AND THIRD AUTHENTICATION FACTORS, TRANSMIT DATA GENERATED BY THE METERING DEVICE TO THE CLOUD SERVER

FIG. 4B

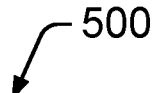

502 RECEIVE FROM THE METERING DEVICE, BY OPERATION OF THE HEADEND DEVICE, A SERIAL NUMBER OF THE METERING DEVICE, THE RANDOM ID OF THE METERING DEVICE, AND THE SECRET, WHEREIN THE RECEIVING IS FROM THE PRIVATE NETWORK

504 SEND TO THE CLOUD SERVER, BY OPERATION OF THE HEADEND DEVICE, THE SERIAL NUMBER OF THE METERING DEVICE, THE RANDOM ID, AND THE SECRET, WHEREIN THE SENDING IS PERFORMED OVER THE INTERNET

FIG. 5

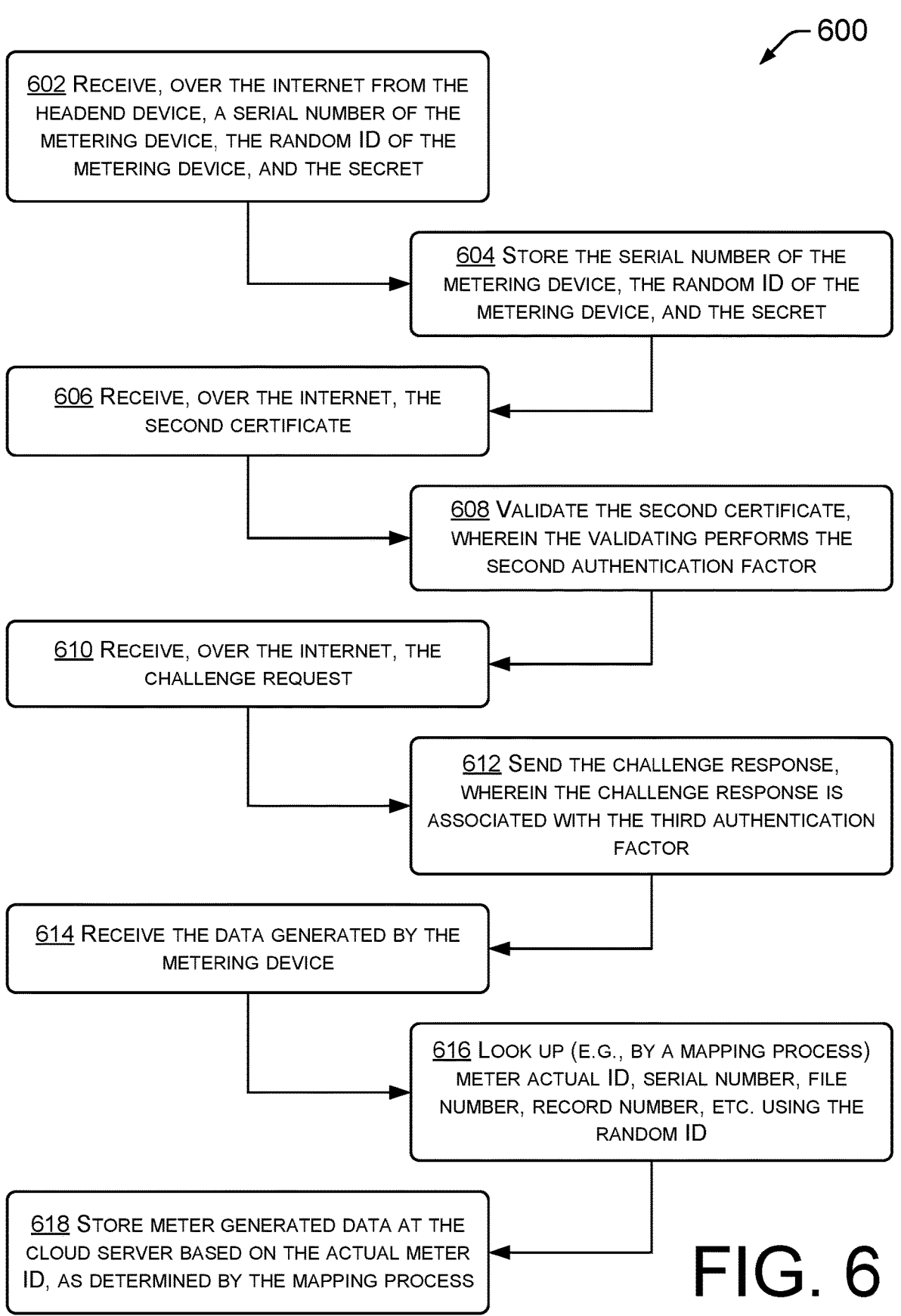

602 RECEIVE, OVER THE INTERNET FROM THE HEADEND DEVICE, A SERIAL NUMBER OF THE METERING DEVICE, THE RANDOM ID OF THE METERING DEVICE, AND THE SECRET

604 STORE THE SERIAL NUMBER OF THE METERING DEVICE, THE RANDOM ID OF THE METERING DEVICE, AND THE SECRET

606 RECEIVE, OVER THE INTERNET, THE SECOND CERTIFICATE

608 VALIDATE THE SECOND CERTIFICATE, WHEREIN THE VALIDATING PERFORMS THE SECOND AUTHENTICATION FACTOR

610 RECEIVE, OVER THE INTERNET, THE CHALLENGE REQUEST

612 SEND THE CHALLENGE RESPONSE, WHEREIN THE CHALLENGE RESPONSE IS ASSOCIATED WITH THE THIRD AUTHENTICATION FACTOR

614 RECEIVE THE DATA GENERATED BY THE METERING DEVICE

616 LOOK UP (E.G., BY A MAPPING PROCESS) METER ACTUAL ID, SERIAL NUMBER, FILE NUMBER, RECORD NUMBER, ETC. USING THE RANDOM ID

618 STORE METER GENERATED DATA AT THE CLOUD SERVER BASED ON THE ACTUAL METER ID, AS DETERMINED BY THE MAPPING PROCESS

FIG. 6

ELECTRICITY METER AND SYSTEM HARDENED AGAINST ATTACK VECTORS

RELATED APPLICATIONS

This patent application claims benefit of priority to U.S. patent application Ser. No. 63/443,308, titled "ELECTRICITY METER AND SYSTEM HARDENED AGAINST ATTACK VECTORS", filed on 3 Feb. 2023, which is incorporated herein by reference.

BACKGROUND

Cybercriminals are well-known to be involved in credit card theft, banking fraud, data ransom, identify theft, cyber-attacks, intentional infrastructure damage, and similar endeavors. Unfortunately, such criminals are increasingly likely to target the utility industries, such as electricity, natural gas, and water, etc.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIGS. 4A and 4B are a flow diagram showing example operation of a metering device.

FIG. 5 is a flow diagram showing example operation of a headend device within an advanced metering infrastructure (AMI) network.

FIG. 6 is a flow diagram showing example operation of a cloud server or other networked computing device with an internet connection.

DETAILED DESCRIPTION

Overview

Figure 1:
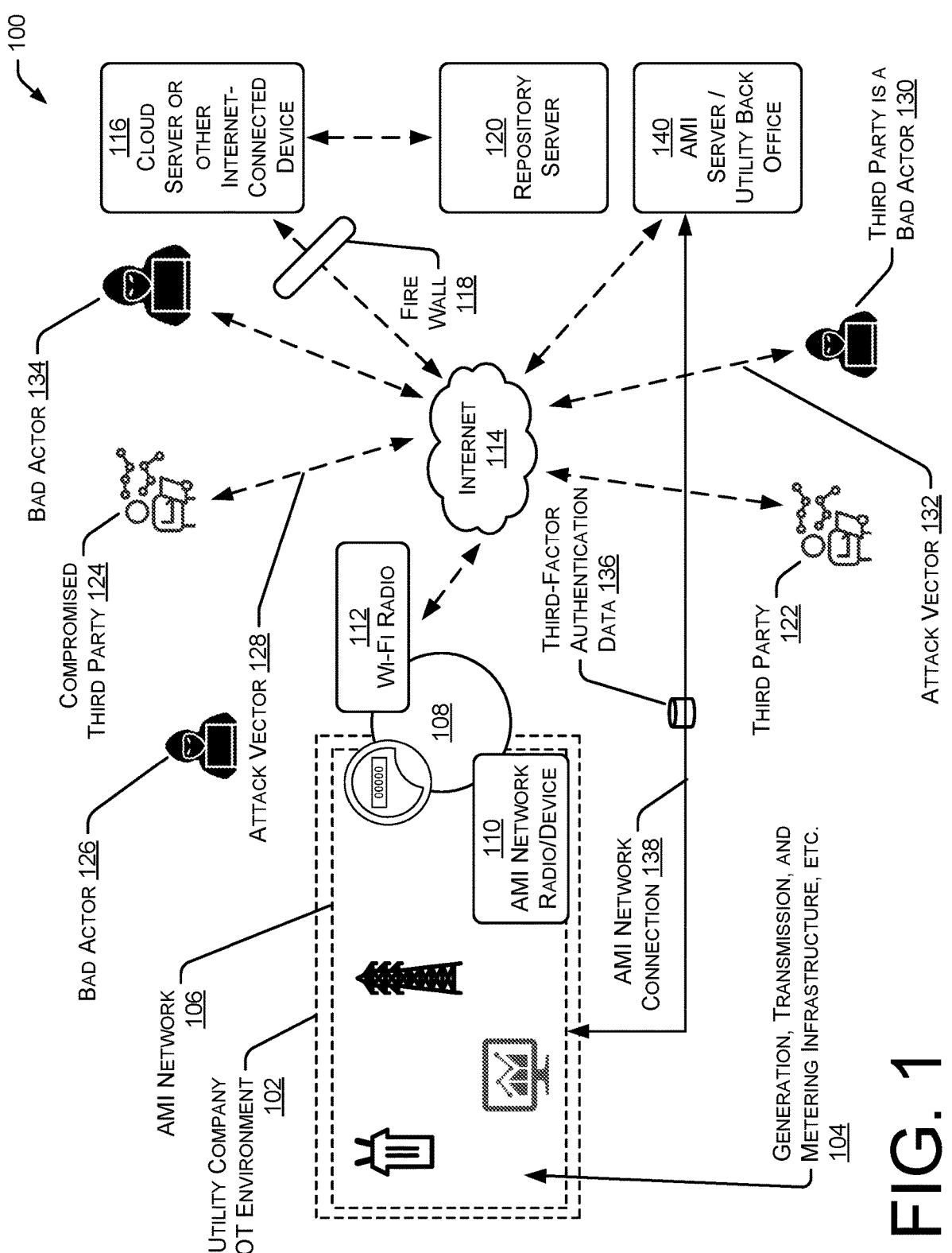
FIG. 1 is a block diagram showing an example system, including the utility company information technology (IT) and operational technology (OT) environments, and showing techniques to provide security.

An electricity meter and electricity system or grid that is hardened against attack vectors (e.g., the actions of bad actors, such as computer hackers) is described. The example system is hardened in part by automated multiple-factor authentication schemes that are enabled over multiple communication channels. In the example, a utility company controls an operational technology (OT) environment, comprising generation, distribution, and metering infrastructure. The OT environment may also include an advanced metering infrastructure (AMI) network to provide internal communications. In an example, metering devices may utilize customer's Wi-Fi to gain access to the internet. Consumption data (e.g., kilowatt hours used) may be transmitted over the internet. Accordingly, it is important to prevent a bad actor from "impersonating" the metering device and/or a cloud server configured to communicate with the metering device. Such impersonation could be used to under-report consumption of metering devices, or to gain access to—or control over—devices of the OT environment.

In an example, multiple authentication factors are used to prevent such impersonation. In an example of one such factor, each metering device creates, determines, and/or selects a secret, and sends the secret over the AMI network to a utility company headend device (e.g., a computing device and/or server). While a bad actor may be able to intercept messages sent over the internet, it is much more difficult for the bad actor to intercept the secret when sent over the AMI network. This is true at least in part because: (1) gaining access to the AMI network would represent an additional network to access (in addition to the wi-fi and/or internet over which data is sent); and (2) the AMI network may be proprietary to the utility company and may require physical changes by the bad actor to gain access. This is particularly burdensome on a remotely located bad actor.

Example systems and devices operate using techniques to provide communications between an electricity meter and a cloud server, a repository server, and/or a data center. These communications are hardened against attack vectors. In an example, a centralized model (described herein) minimizes security risks to utility operational technology (OT) networks.

In an example, a meter is configured to be able to establish connection with one and only one cloud server over the internet or other public network. The identity of the cloud server may be preconfigured in hardware and/or software of the meter. A two-factor, three-factor, or multifactor authentication connection may be utilized, and configured for operation only with an intended target server. The meter refuses and/or is incapable of establishing any other public connection. The cloud server is highly vetted, secured, monitored, audited, and regularly server penetration (PEN) tested.

In an example, third parties connect to a cloud server. Accordingly, the third parties have no direct connection to metering devices. Because the third parties have no direct connections, there are no attack vectors between third parties and the meters. Commonly accepted cloud-to-cloud security models may be implemented between third parties and the cloud server.

In an example method, a meter establishes connection with one and (typically) only one preconfigured, highly-vetted, highly-secured cloud server (e.g., a "target receiver"). Two (or more) factor authentication is required of the meter for every connect/reconnect, and ensures that it is the correct and/or legitimate cloud server to which the meter makes connection. A headend server with access to an AMI network may be used to transfer secrets from respective meters to the highly-vetted, highly-secured target receiver.

Example Systems and Techniques

A distributed intelligence data cloud solution provides secure communication between utility meters and utility company server(s), and may utilize automated multi-factor authentication over multiple communication channels and/or networks. This enables utility meters to verify the identity of devices with which communications are made and to anonymize messaging and data transfer while utilizing the benefits of communicating over the internet. Utility meters have access to an advanced metering infrastructure (AMI) network, which is highly secured, but may have low bandwidth. The AMI network may be used to share a "random" (and/or pseudo random, arbitrary, etc.) meter-generated identification (ID) and a meter-generated secret with devices connected to the AMI network. The shared data may be used to authenticate and anonymize communication over the less secure (as compared to the AMI network), but higher bandwidth, internet. The random ID and/or the secret may be character strings. The character strings may be meter-generated, installed at manufacture, injected at installation, etc.

FIG. 1 shows an example system 100, including the utility company information technology (IT) and operational technology (OT) environments, and showing techniques to provide security. A utility company OT environment 102 may include generation, transmission and/or distribution facilities 104, metering, and other infrastructure. The OT environment 102 may also include a private network, such as the advanced metering infrastructure (AMI) network 106. The private network may be owned and maintained by a utility company for its exclusive use. In some examples, the private network may be leased to regulated third parties, such as companies related to solar power generation, electric vehicle charging, energy conservation, etc. Known utility company OT environments are common targets for foreign- and domestic-sponsored cyber-attacks.

An electricity meter 108 or other metering device (e.g., gas or water meter(s)) may be in communication with the AMI network 106 by means of an AMI network radio and/or device 110, such as a modem, radio, etc., within the metering device. In examples, the AMI network 106 may be organized in a "star" or "mesh" configuration, and may use radio frequency (RF) transmitters or powerline communications (PLC) technologies, etc. Additionally, the meter 108 may include a Wi-Fi or other radio 112 that allows the meter to communicate with the internet 114, such as by using a residential Wi-Fi connection or other connection to the internet.

A cloud server, a "target server," or other server 116 connected to, and/or in communication with, the internet 114 is able to communicate with the metering device 108. The communication may be through a firewall 118. In an example, the metering device 108 sends utility consumption data and/or other information (e.g., voltage levels, electrical frequencies, electrical quality, voltage spikes, voltage dips, etc.) to the cloud server 116 and/or repository server 120. In an example, third parties 122, 124, such as a utility compan(ies), data analytics compan(ies), etc., may be given access to data of the repository server 120. The repository server may be connected to the internet and/or may be directly connected to the cloud server and configured as a storage device.

In an example, industry standard cloud-to-cloud security models and/or products are implemented for third party data access. Despite such implementations, the example third party 124 is compromised by a bad actor 126. Due to the compromise, the bad actor 126 obtains data intended for the third party 124 using attack vector 128. In a second example, a bad actor 130 masquerades as a third party, and uses attack vector 132 to obtain data.

In a further example, bad actor 134 attempts to intercept data traveling between the Wi-Fi radio 112 of the meter 108 and the cloud server 116 connected to the internet. In an example, the bad actor 134 attempts to impersonate the server 116, and thereby obtain data from one or more metering devices 108.

However, techniques are provided that prevent the bad actor 134 from obtaining data from the metering device 108.

In an example of the techniques, a three-factor authentication system may be implemented. In an example of two of the three factors, a metering device 108 and the cloud server exchange certificates. The metering device 108 validates the cloud server certificate (which is signed by a trusted authority), thereby proving to the satisfaction of the metering device that the cloud server is authentic. Similarly, the cloud server 116 validates the certificate (also signed) of the metering device 108, thereby proving to the satisfaction of the cloud server that the metering device is authentic.

In an example, the system 100 uses a third authentication process to provide additional security. In the example, the third authentication process helps to prevent communication between the metering device and/or the cloud server if one or both has been compromised by a bad actor. In the example, third-factor authentication information 136 may be generated by the metering device 108, and may constitute "a secret," not known to the bad actor 134. The secret 136 is sent along an AMI network connection 138 of the AMI network 106 (which is part of the utility company OT environment 102). Since the secret 136 is sent through the AMI network 106, the bad actor is much less able to obtain that information. The third-factor information 136 (e.g., the secret generated by the metering device) is sent to the AMI server 140 (e.g., a utility company AMI headend device) over the AMI network connection 138. The AMI headend server 140 forwards the secret to the server 116 over the internet.

To provide another layer of security (the third authentication factor), the metering device 108 challenges the cloud server 116 to prove it has the secret. The cloud server 116 provides the secret (or data that required the secret to create, such as a hash or time hash) to the metering device 108. This increases the trust by the metering device of the cloud server 116 and constitutes a third authentication factor.

Since the bad actor 134 is unable to access the AMI network 106, it is only able to obtain the secret if the cloud server 116 is profoundly compromised. Accordingly, the task of "spoofing" the metering device 108 by impersonating the cloud server 116 is vastly more difficult. Accordingly, three-factor authentication may be performed in a utility system environment, and in an automated manner without human interaction, thereby protecting the system 100 from the bad actor 134.

Figure 2:
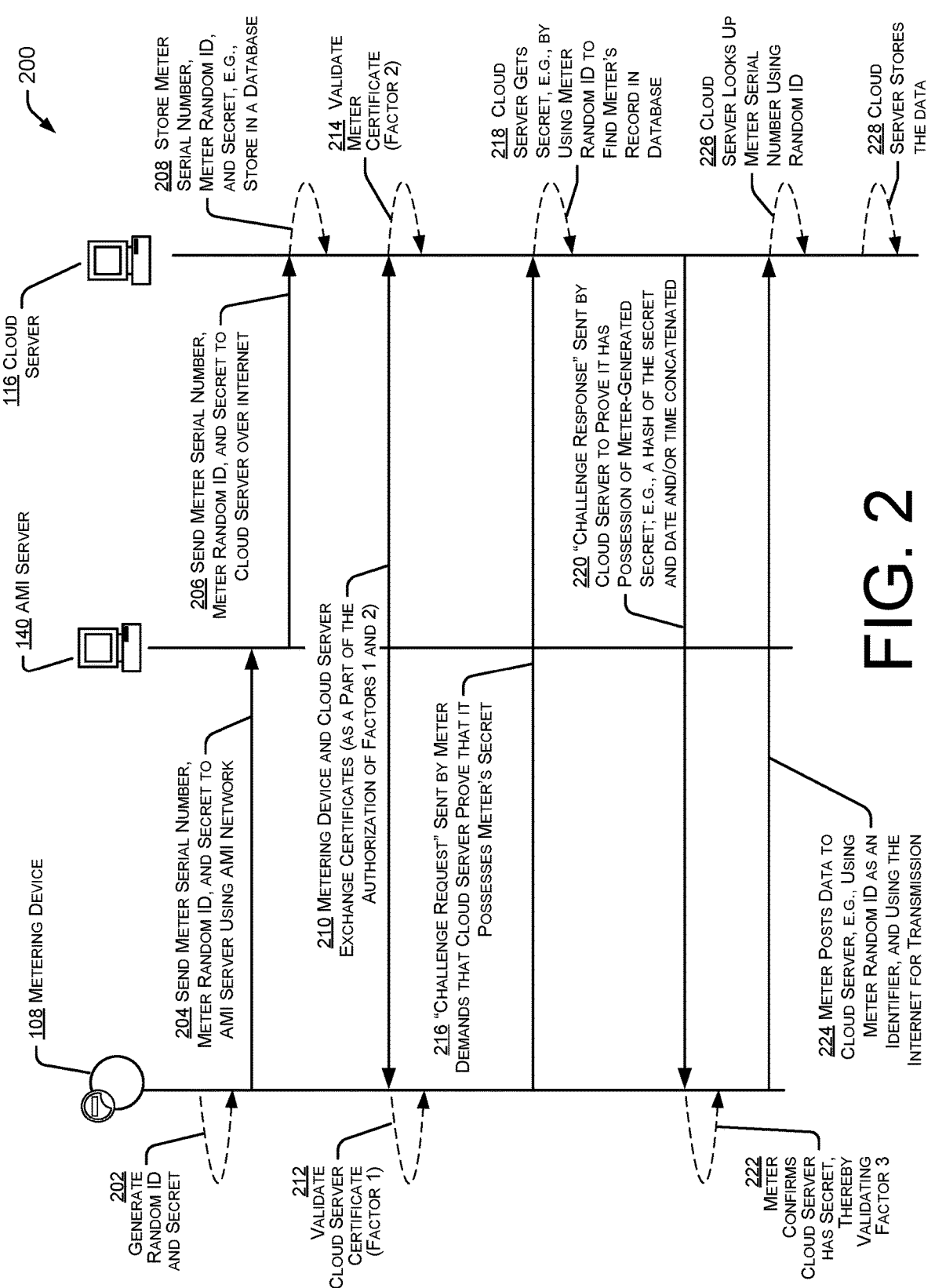
FIG. 2 is a diagram showing example operational techniques of, and interactions between, a metering device, an Advanced Metering Infrastructure (AMI) network headend server, and a cloud server (i.e., server attached to the internet).

FIG. 2 shows techniques 200 including sequences, actions, relationships, and/or interactions between the metering device 108, the AMI network headend server 140, and the cloud server 116. The example techniques 200 utilize communications over a private network (e.g., the AMI network) and the internet. The techniques 200 may be performed by execution of software defined on memory devices of the metering device 108, the AMI server 140, the cloud server 116, and/or other devices used in (or usable in) the system 100 of FIG. 1.

Action 202 shows example generation of a random identification (ID) and a secret of the metering device 108. The use of the random ID means that the meter only identifies itself to the cloud server using the random identification. Without data and/or a function for mapping the random ID to the real or actual meter ID it is more difficult for a bad actor to identify the meter. In an example, the real meter ID is only transmitted over the high security network (e.g., AMI network). In the example of FIG. 1, the metering device 108 generates a random ID for itself. The ID can be a string of characters, a numerical value, or based on some other format. The meter also generates a "secret." The secret could also be a string of characters, or it could be information created with the meter's private key, for decoding with the meter's public key. Such a secret would be difficult if not impossible for a bad actor to generate, to thereby impersonate the metering device.

Action 204 shows example notification (or transmission) by the metering device of the meter's serial number, meter random ID, and/or the secret. The transmission of action 204 may be made from the metering device 108 to the AMI server 140 over the AMI network. In the example of FIG. 1, the third factor authentication data 136 travels on the AMI network connection 138 to the AMI server 140.

Action 206 shows example notification (or transmission)—from the AMI server 140 to the cloud server 116—of the meter's serial number, meter random ID, and the secret. The transmission of action 206 may be made from the AMI server 140 to the cloud server 116 using the internet.

At action 208, the cloud server 116 stores the meter's serial number, meter random ID, and the secret in its own memory. Referring to the example of FIG. 1, this data may also and/or alternatively be stored in the repository server 120. Alternatively, the repository may be a memory device and/or data structure of the cloud server 116.

At action 210, and as part of a validation process of two factors, the metering device 108 sends the cloud server 116 a certificate of the metering device. Similarly, the cloud server 116 sends the metering device 108 a certificate of the cloud server. In an example, both certificates are signed by a trusted authority in a manner that can be confirmed in a verification or validation process.

At action 212, the metering device 108 validates the certificate of the cloud server 116. In an example, the metering device 108 verifies that the certificate of the internet-connected cloud server 116 is signed by a trusted authority. Assuming success, the metering device 108 trusts the validity of the identity of the cloud server 116. Success of action 212 constitutes a first authentication factor.

At action 214, the cloud server 116 validates the certificate of the metering device 108. In an example, the cloud server 116 verifies that the certificate of the metering device 108 is signed by a trusted authority. Assuming success, the cloud server 116 trusts the validity of the identity of the metering device 108. Success of action 214 constitutes a second authentication factor.

At action 216, and as part of a third authentication factor, the metering device 108 sends the cloud server 116 a "challenge request." In an example, the metering device 108 challenges the cloud server 116 to provide proof that the cloud server possesses the secret of the metering device. Referring to FIG. 1, the secret 136 was transferred from the metering device 108, through the AMI network connection 138 of the AMI network 106, to the AMI server 140, then through the internet to the cloud server 116. Accordingly, when challenged, the cloud server 116 is able to respond to the metering device 108 with the secret because of assistance of the AMI server 140 that has access to the AMI network 106 via connection 138. It would be very difficult for a bad actor to receive similar assistance.

At action 218, the cloud server 116 looks up the secret of the metering device 108 in preparation of sending a message. The process by which the cloud server 116 looks up the secret may utilize the random ID of the metering device, which may be mapped to the actual ID of the metering device. The random ID or the actual ID of the metering device 108 may be used to access information regarding the secret, such as in a database record. For example, the random ID may be mapped to the actual ID, and the actual ID used to obtain the correct record from the database.

The cloud server 116 may prove possession of the secret of the metering device by sending the secret, a hash of the secret, a time hash of the secret, or an encryption of the secret (or the hash) using the private key of the cloud server 116. The hash of the secret and the encryption of the secret advantageously do not send a plain-text version of the secret over the network. Accordingly, at action 218 the cloud server 116 may hash and/or encrypt (e.g., together with a time string) the secret of the metering device 108.

At action 220, a challenge response with information derived from the secret is sent from the server 116 to the metering device 108. As noted above, the challenge may be satisfied with a hash of the secret. To prevent a bad actor masquerading as the cloud server 116 from using an intercepted hash in an attempt to spoof the metering device 108, the cloud server may be required to send a "time hash" of the secret to the metering device. The time hash of the secret may be a hash of the secret concatenated with the date and/or time of the challenge 216. Because a time string is concatenated to the secret before the hash is performed, the hash output data cannot be reused by a bad actor at a later time.

At action 222, the metering device 108 verifies the secret is correct, thereby resulting in a third authentication "factor" in a process of automated multiple-factor authentication over multiple communication networks. Thus, in the verification of the third authentication factor, the metering device 108 validates that the internet-connected cloud server 116 has the secret that the metering device generated (or otherwise obtained).

Upon completion of action 222, the automated three-factor authentication process, using multiple communication networks (the AMI network 106 and the internet 114) has succeeded in authenticating the devices.

At action 224, responsive to the success of the three authentication factors, the metering device 108 begins to post data using the random ID of the meter as an identifier and using the internet for transmission. The random ID tends to protect the data by "anonymizing it," in the sense that if the data is intercepted it would not contain an explicit reference or link to any particular meter. That is, without the ability to "map" between the random ID of the meter and its actual ID, address, and/or serial number, if the data is intercepted by a bad actor, the actor would have no idea of the relevance of the data. Accordingly, if the bad actor intended to lower the consumption data associated with a particular meter not having that meter's random ID would prevent the creation of such data in a form acceptable to the cloud server.

At action 226, the cloud server 116 looks up the meter's random ID to determine a location in memory (e.g., a record within a database or other data structure) into which the data is written. Accordingly, the random ID is usable to determine a record of a database associated with the correct metering device.

At action 228, the cloud server 116 stores the data obtained responsive to action 224 by the metering device. In one example, electricity consumption data is written into a data structure in the repository server 120 (as seen in FIG. 1).

Figure 3:
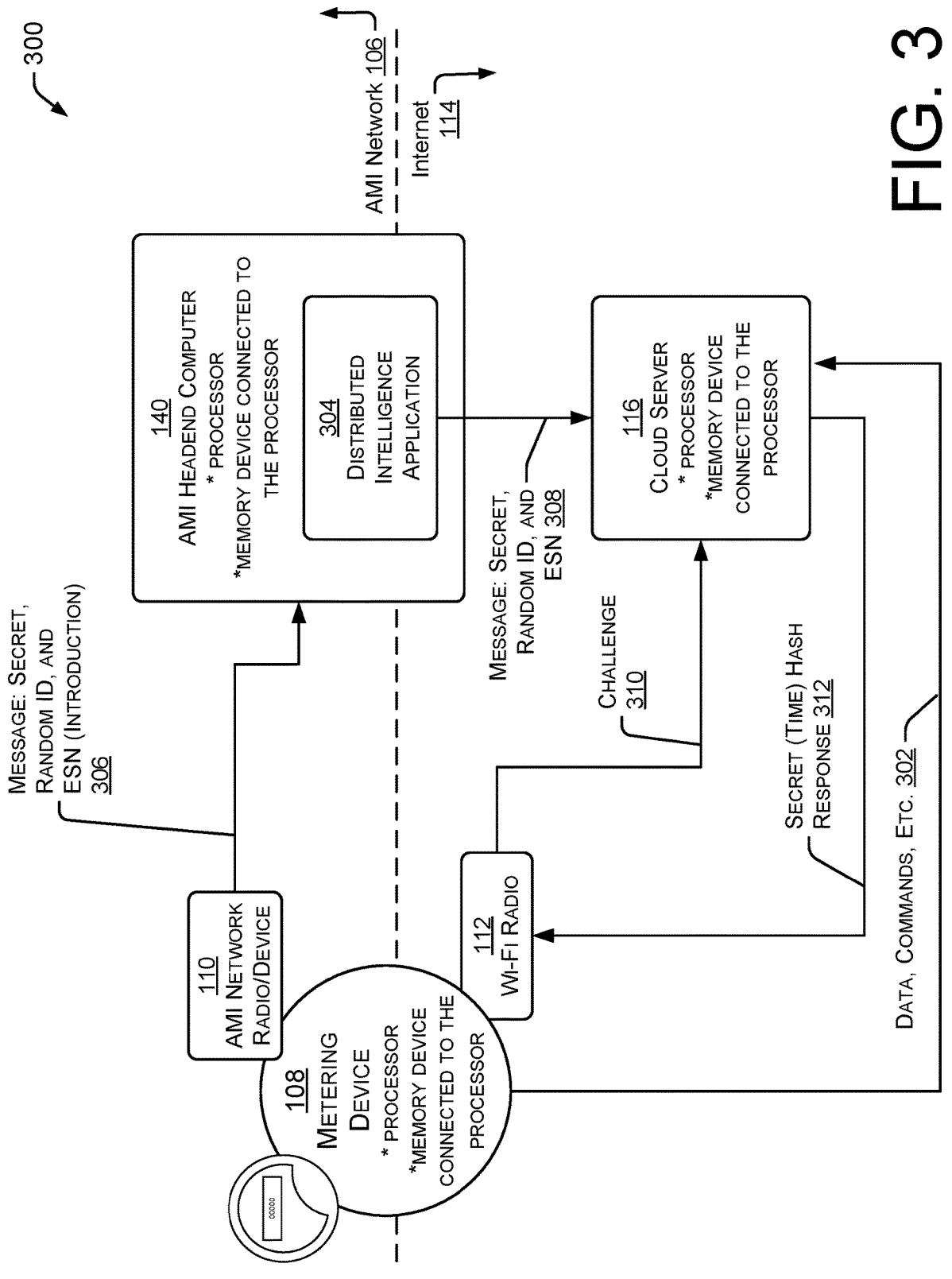
FIG. 3 is a block diagram showing a system including devices within the information technology (IT) and operational technology (OT) spaces, and example techniques to perform a third authentication factor.

FIG. 3 shows an example of an authentication and trusted relationship-generating system 300 wherein a "third authentication factor" is generated by devices and communications using a private network (e.g., AMI network 106) and a public network (e.g., the internet 114). The third authentication factor supplements and synergistically interacts with two other authentication factors based on: the meter verifying the authenticity of the certificate of the cloud server; and the cloud server verifying the authenticity of the certificate of the metering device.

In the example of FIG. 3, the metering device 108 may use a Wi-Fi radio 112 to communicate over a Wi-Fi service maintained by a customer associated with metering device 108. Accordingly, the metering device 108 is connected to the internet 114. The metering device 108 may also communicate using an AMI network radio 110 in communication with an AMI network 106. The AMI network may include one or more other meters, relays, and/or data concentrator devices in a mesh or star type network. Such inter-device communications may utilize proprietary technology and encryption and provide security aspects not available in the public internet.

In an example, the AMI network 106 may be used to establish a trusted relationship between the metering device 108 and the cloud server 116. Once the relationship is established, the internet 106 may be used to transfer data, commands, etc. 302 in a secure manner.

The metering device 108 may be a smart metering device having a processor, memory, an operating system, applications, and/or other features. Metrology devices may be configured to measure electricity, natural gas, water, etc. Application(s), driver(s), and/or an operating system may control operation of a Wi-Fi radio 112, which may use Wi-Fi or other communications technology. The Wi-Fi radio 112 may be used (along with other devices) to transfer data over the internet to the cloud server 116 after a trusted relationship with the metering device 108 is established. Application(s), driver(s), and/or an operating system may also control operation of an AMI network radio 110, which may use radio frequency signals, powerline communications, or other communications technology. The AMI network radio 110 may be used to transfer the secret, random ID, and/or meter serial number over the AMI network to the AMI headend server 140. The AMI headend server 140 may be used to relay that data to the cloud server 116. The cloud server 116 may use the secret to establish a trusted relationship with the metering device 108.

An AMI headend computer 140 may host a distributed intelligence (DI) application 304. The AMI headend computer 140 is part of the OT space (which is served by the AMI network 106), and communicates over the internet with the cloud server 116, which is located in the IT space (which is served by the internet 114).

In operation, the meter 108 transmits a message 306 including one or more of: a secret; a random ID; and an endpoint (meter) serial number (ESN). The message may be sent to the distributed intelligence application 304 on the AMI headend computer 140. The message 306 is transmitted over the AMI network 106, which can be a proprietary network of a utility (e.g., electricity) company. The use of a private network (e.g., AMI network 106) presents significant challenges to a bad actor, who may struggle even to access the network.

The AMI headend server 140 transmits a message 308 that includes information that is the same as, derived from, and/or is similar to, message 306. The message 308 is sent to the cloud server 116. The message 308 may be transmitted over the internet 114. In an example, the utility company monitors the AMI headend computer 140 and the cloud server 116 diligently, to avoid compromise.

The metering device 108 and the cloud server 116 may exchange certificates, with each validating the certificate of the other based on a signature of a trusted third party and/or other techniques. These validations provide first and second factors of authentication.

A third factor of authentication provides the metering device 108 with greater assurance that the cloud server 116 is not being impersonated by a bad actor. In example operation, the metering device challenges the cloud server to show the metering device that the cloud server is in possession of the secret of the metering device. In an example, the secret or a hash of the secret, provided by the cloud server to the meter would provide that proof. In the example of FIG. 3, the metering device 108 sends a message 310 challenging the cloud server 116 to prove that it possesses the secret of the metering device.

In response to the challenge message 310, the cloud server 116 sends a response message 312. The message may include the secret, or more likely a hash of the secret. To prevent a bad actor masquerading as the cloud server 116 from using an intercepted hash in an attempt to spoof the metering device 108, the cloud server may be required to send a "time hash" of the secret to the metering device. The time hash of the secret may be a hash of the secret concatenated with the date and/or time of the challenge 310. Thus, the hash data cannot be reused by a bad actor at a later time.

The secret hash response 312 (similar to event 218 of FIG. 2) helps to provide a third authentication "factor." This factor is significant in that the cloud server 116 could not have made the response without information arriving at event 308 based on traffic between the metering device and AMI headend computer over the AMI network 106. Thus, the secret hash response 312 is more than just another piece of information a bad actor would have to obtain, that piece of information must be obtained by access to devices on a different and more difficult to compromise network (i.e., the AMI network 106).

Following reception of the time hash of the secret in message 312, the meter 108 is in a position to reasonably trust the authenticity of the cloud server 116. Accordingly, data and/or commands 302 may be sent (e.g., in an encrypted form) between the meter and the cloud server 116. As an example, the data may include information regarding quantities of electricity measured by the metering device 108 (i.e., consumption data). In one example, consumption data may be sent at intervals and the above operation may be repeated in each interval to reestablish the trusted relationship. In an alternative example, the trusted relationship does not have to be repeated for each transmission. This third factor in the authentication process helps to ensure that the cloud server 116 is the correct recipient of the data sent by the metering device 106. (As noted above, the first and second factors are related to verification of the certificate of the cloud server by the metering device and verification of the certificate of the metering device by the cloud server.)

Accordingly, the example of FIG. 3 shows that the metering device 106 establishes the trusted connection with one (and typically only one) preconfigured, highly-vetted, highly-secured cloud server 116. Establishment of the trusted connection-based at least in part on one or more of the secret, the random ID, and/or the metering device serial number-constitutes a "third factor" used to build the trusted relationship between the metering device and server 116. Significantly, the third factor is based at least in part on communications over the AMI and/or proprietary network. The third factor supplements and synergistically interacts with the trusted relationship based on verification of certificates of the metering device and cloud server that are exchanged over the internet.

Example Methods

In some examples of the techniques discusses herein, the methods of operation may be performed by one or more application specific integrated circuits (ASIC) or may be performed by a general-purpose processor utilizing software defined in computer readable media. In the examples and techniques discussed herein, memory devices within the metering device 108, the AMI server 140, and/or the server 116 may comprise computer-readable (or processor-readable) media (e.g., memory device(s)). Accordingly, the techniques described herein may be implemented and/or performed by execution of software defined on the memory devices.

The computer-readable media may take the form of volatile memory, such as random-access memory (RAM) and/or non-volatile memory, such as read only memory (ROM) or flash RAM. Computer-readable media devices include volatile and non-volatile, removable, and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media includes non-transitory media, and does not include transitory media, such as modulated data signals and carrier waves, and/or other information-containing signals.

FIG. 4 shows example operation 400 of a metering device. The operation 400 may describe aspects of the operation of the metering device 108 of FIGS. 1, 2 and/or 3.

At block 402, a random ID and a secret are generated by operation of the metering device. In operation, the random ID may accompany transmissions of meter-generated data sent to the cloud server. The random ID provides anonymity to such data, in that if the data is intercepted by a bad actor, it cannot easily be traced back to a particular metering device. In contrast, if the meter serial number was used, then a bad actor whose property used that meter would know the number with which to associate metering data fraudulently sent to the cloud server. Thus, utilization of a random ID means that if a bad actor intends to send false meter-generated data to the cloud server (such as to lower the bad actor's electricity bill) the bad actor must know the random ID, not just the serial number of the meter (which may be stamped on the meter's enclosure). The secret is used to perform a third authentication factor, wherein the cloud server distinguishes itself (to the meter) from bad actors who do not possess the secret.

At block 404, the metering device transmits (e.g., to a headend device) a serial number of the metering device, the random ID, and the secret. In an example, the transmitting is performed at least in part over a private network. The private network may be an advanced metering infrastructure (AMI) network. Use of the AMI network to transmit the data makes it difficult for bad actors to intercept the data.

Accordingly, low-bandwidth data such as the serial number of the metering device, the random ID, and the secret may be sent over the AMI network.

At block 406, a first certificate is received, from the cloud server, at the metering device. This action is seen at action 210 of FIG. 2. In an example, the certificate address should match the domain name system (DNS) address of the intended cloud server. Additionally, the certificate should be signed by a trusted authority.

At block 408, the metering device validates the correctness and/or propriety of the certificate, thereby validating a first authentication factor. In an example, the metering device validates that the certificate address matches the intended DNS/address and that it is signed by a trusted authority. Thus, the metering device gains confidence that it is dealing with the cloud server and not a bad actor.

At block 410, the metering device sends to the cloud server a second certificate (i.e., a certificate associated with the metering device) that is associated with a second authentication factor. The second certificate will be validated by the cloud server, thus giving the cloud server confidence that it is dealing with the metering device and not a bad actor. Validation of the second certificate results in a second authentication factor.

At block 412, the metering device sends a challenge request with the random ID to the cloud server. In the example of FIG. 2, the challenge request 216 demands that the cloud server prove that it is in possession of the secret generated by the metering device.

At block 414, the metering device receives, from the cloud server, a challenge response. In the example of FIG. 2, the response 220 proves to the metering device 108 that the cloud server 116 has possession of the secret, making it more likely that the cloud server is not a bad actor. A second example of the challenge 310 and response 312 is seen in FIG. 3. The response may include the secret or information based on the secret. The information may include a hash of the secret or a time hash of the secret, i.e., a hash of a concatenation of a time string and the secret.

At block 416, the metering device performs a third factor authentication by validating correctness of the secret. In the validation process, the meter 108 determines if the cloud server has possession of the secret by performing its own time hash of a time string concatenated to the secret, and then comparing the results to the response sent by the cloud server. To assist in the validation process, the cloud server may send the time string to the metering device in clear text. The time string must be less than a threshold time in age. Alternatively, the time of transmission of the challenge request may be used.

At block 418, in response to success of the first, second, and third authentication factors, data generated by the metering device is transmitted to the cloud server. The transmission of the data may be at least in part over the internet to the cloud server, and the transmission may be performed using the random ID as an identifier of the origin of the data.

FIG. 5 shows example operation 500 of a headend device. In the example of FIGS. 1-3 and 5, the headend device 140 acts as a conduit between the metering device 108 and the cloud server 116 for the transmission of data used to perform authentications (e.g., the secret generated by the metering device and the random ID of the metering device). As a conduit, the headend device 140 bridges between the AMI network and the internet. The headend device 140 is configured to communicate with the metering device 108 over the AMI network. The headend device 140 is also configured to communicate with the cloud server 116 over the internet.

Accordingly, the headend device 140 is able to pass a secret (obtained from the metering device 108 over the AMI network 106) to the cloud server 116 using the internet. The secret allows the cloud server 116 to respond to a challenge from the metering device 108, and to prove its authenticity and/or legitimacy to the metering device before the metering device sends data (e.g., electricity consumption data) to the server.

At block 502, the headend device operates to receive (e.g., from the metering device) a serial number of the metering device, the random ID of the metering device, and the secret. This data may be received over a private network, such as the AMI network 106 seen in the example of FIG. 3.

At block 504, the headend device operates to send to the cloud server, the serial number of the metering device, the random ID, and the secret. In an example, this data is sent to the cloud server over the internet.

Referring to the example of FIG. 3, the headend computer 140 is in a position to relay information from the metering device to the cloud server. The headend computer 140 receives the information from the metering device over a private network (e.g., an AMI network), and relays the information to the cloud server over the internet.

FIG. 6 shows example operation 600 of the cloud server or other networked computing device. Referring to the example of FIG. 3, the cloud server 116 receives (at 308) from the AMI headend computer 140, the secret generated by the metering device 108. This allows the cloud server 116 to respond to a challenge from the metering device 108, and to thereby validate a third authentication factor and establish trust of the server by the metering device. The trust allows the metering device to send data (e.g., electricity consumption data) to the server without concern that the server is actually a bad actor.

At block 602, the cloud server receives (e.g., over the internet) from the headend device, the serial number of the metering device, the random ID of the metering device, and/or the secret generated by the metering device. In the example of FIG. 3, the cloud server 116 receives data 308 over the internet 114.

At block 604, the cloud server stores in its memory device the serial number of the metering device, the random ID of the metering device, and the secret generated and/or provided by the metering device. In the example of FIG. 2, the cloud server 116 stores the incoming data in action 208.

At block 606, the cloud server receives from the metering device, the certificate of the meter to thereby prove the identity of the metering device. This is seen in more detail at action 210 of FIG. 2.

At block 608, the second certificate is validated by the cloud server. In an example, the validating results in the second authentication factor. In the example of action 210 of FIG. 2, in a process utilizing mutual transport layer security (mTLS), the metering device 108 presents its certificate to the cloud server and the cloud server presents the server certificate to the meter. If they both trust the certificates (e.g., at actions 212 and 214) based on signature by a trusted authority, the handshake is completed.

At block 610, the server receives (e.g., from the metering device) a challenge request. In sending the request, the metering device seeks to determine if the server has obtained the secret sent to the server via the AMI headend device and at least partially over the AMI network. That is, the metering device seeks to determine if the cloud server is the real cloud server or a bad actor. By verifying the identity of the cloud server, the meter avoids sending electricity consumption data (or other information) to a bad actor posing as the cloud server.

At block 612, the cloud server sends the challenge response. In the example of FIG. 2, the challenge response 220 may be a "time hash" of the secret concatenated with a time string. In the example of FIG. 3, the response 312 is sent via the internet, and received by the metering device (e.g., over a Wi-Fi connection).

At block 614, the cloud server receives data generated by the metering device. The data may be electricity consumption data, data regarding smart grid operation, commands, responses to commands, etc. In some cases, the server sends data to the metering device, such as commands, software updates, etc.

At block 616, the cloud server uses the random ID of the metering device to look up (e.g., by a mapping process, database access, etc.) an actual meter ID, serial number, file number, record number, etc. using the random ID. Thus, the random ID of the metering device is like a code name, to keep the data anonymous during transit. Once safely received at the cloud server, the data is associated with an actual ID of the metering device within the records of the cloud server.

At block 618, using the actual metering device ID, the meter-generated data is stored by the cloud server. The storage may be within a database or other data structure.

Example Systems and Devices

The following examples of an electricity meter and system hardened against attack vectors are expressed as numbered clauses. While the examples illustrate a number of possible configurations and techniques, they are not meant to be an exhaustive listing of the systems, methods, and/or techniques described herein.

1. A method by which a metering device may establish a secure communications connection, comprising: generating, by operation of the metering device, a random identification (ID), and a secret; transmitting, by operation of the metering device, to a headend device, the random ID and the secret, wherein the transmitting is performed at least in part over a private network; receiving, at the metering device, a first certificate from a cloud server; validating the first certificate, by operation of the metering device, wherein the validating results in a first authentication factor; sending, from the metering device to the cloud server, a second certificate associated with a second authentication factor; sending, by operation of the metering device, a challenge request to the cloud server; receiving, at the metering device and from the cloud server, a challenge response comprising information based on the secret from the cloud server connected to the internet; validating, by operation of the metering device, that the cloud server had possession of the secret, wherein the validating results in a third authentication factor; and responsive to success of the first, second, and third authentication factors, transmitting data generated by the metering device to the cloud server.

2. The method of clause 1, wherein transmitting the data generated by the metering device comprises: transmitting the data together with the random ID.

3. The method of clause 1, wherein the challenge response comprises: a hash of a time value concatenated to the secret; and the time value in cleartext.

4. The method of clause 1, wherein the private network comprises an Advanced Metering Infrastructure (AMI) network.

5. The method of clause 1, wherein the private network is used to transmit data used in at least one authentication factor, and wherein transmitting the data generated by the metering device is performed using the internet.

6. The method of clause 1, wherein the headend device of the private network performs actions comprising: receiving from the metering device, by operation of the headend device, a serial number of the metering device, the random ID of the metering device, and the secret, wherein the receiving is from the private network; and sending to the cloud server, by operation of the headend device, the serial number of the metering device, the random ID, and the secret, wherein the sending is performed over the internet.

7. The method of clause 1, wherein the cloud server connected to the internet performs actions comprising: receiving, over the internet from the headend device, a serial number of the metering device, the random ID of the metering device, and the secret; storing the serial number of the metering device, the random ID of the metering device, and the secret; receiving, over the internet, the second certificate; validating the second certificate, wherein the validating performs the second authentication factor; receiving, over the internet, the challenge request; sending the challenge response; and receiving the data generated by the metering device.

8. A system, comprising: a metering device, comprising: a processor; and a memory device in communication with the processor; an advanced metering infrastructure (AMI) headend device in communication with the metering device over an AMI network; a cloud server connected to the internet and in communication with the AMI headend device, and a secret generated by operation of the processor of the metering device and passed from the memory device of the metering device to the AMI headend device over the AMI network, wherein the secret is passed from the AMI headend device to the cloud server over the internet, and wherein the secret is used by the cloud server to satisfy a challenge by the metering device, to thereby perform an authentication.

9. The system as recited in clause 8, additionally comprising instructions stored in the memory device, that when executed by the processor of the metering device, cause the metering device to perform actions comprising: validating a first factor, wherein validating the first factor comprises validation, by operation of the metering device, of a certificate of the cloud server; validating a second factor, wherein validating the second factor comprises validation, by operation of the cloud server, of a certificate of the metering device; and validating a third factor, wherein validating the third factor comprises passage of the secret from the metering device to the cloud server, and passage of data derived from the secret from the cloud server to the metering device.

10. The system as recited in clause 8, additionally comprising instructions stored in the memory device of the metering device, that when executed by the processor of the metering device, cause the metering device to perform actions comprising: generating, by operation of the metering device, a random identification (ID) and the secret; transmitting, by operation of the metering device, to the AMI headend device, the random ID and the secret, wherein the transmitting is performed at least in part over the AMI network; receiving, at the metering device, a first certificate from the cloud server; validating the first certificate, by operation of the metering device, wherein the validating results in a first authentication factor; sending, from the metering device to the cloud server, a second certificate associated with a second authentication factor; sending, by operation of the metering device, a challenge request to the cloud server; receiving, at the metering device and from the cloud server, a challenge response comprising information based on the secret from the cloud server connected to the internet; validating, by operation of the metering device, that the cloud server had possession of the secret, wherein the validating results in a third authentication factor; and responsive to success of the first, second, and third authentication factors, transmitting data generated by the metering device to the cloud server.

11. The system as recited in clause 8, additionally comprising instructions stored in a memory device of the headend device, that when executed by a processor of the headend device, cause the headend device to perform actions comprising: receiving a serial number of the metering device, a random ID of the metering device, and the secret, from the metering device, wherein the receiving is from the AMI network; and sending the serial number of the metering device, the random ID, and the secret, to the cloud server, wherein the sending is performed over the internet.

12. The system as recited in clause 8, additionally comprising instructions stored in a memory device of the cloud server, that when executed by a processor of the cloud server, cause the cloud server to perform actions comprising: receiving, over the internet from the headend device, a serial number of the metering device, a random ID of the metering device, and the secret; storing the serial number of the metering device, the random ID of the metering device, and the secret; receiving, over the internet, a second certificate; validating the second certificate, wherein the validating performs a second authentication factor; receiving, over the internet, a challenge request; sending a challenge response comprising data derived from the secret; and receiving the data generated by the metering device.

13. The system of clause 8, wherein the challenge is satisfied by actions comprising: transmission of a hash of a string comprising a time value concatenated to the secret.

14. The system as recited in clause 8, additionally comprising: a random identification (ID) of the metering device, wherein data generated by the metering device is associated with the random ID and transmitted by the metering device over the internet to the cloud server, wherein the random ID is mapped to an actual ID of the metering device, and wherein the data generated by the metering device is stored by the cloud server according to the actual ID of the metering device.

15. The system as recited in clause 8, wherein the metering device additionally comprises: a Wi-Fi radio, wherein data generated by the metering device is transmitted over the Wi-Fi radio, through the internet, and to the cloud server.

16. One or more non-transitory computer-readable media storing computer-executable instructions that, when executed by one or more processors, configure a metering device to perform actions comprising: generating, by operation of the metering device, a random identification (ID) and a secret; transmitting, by operation of the metering device, to a headend device, the random ID and the secret, wherein the transmitting is performed at least in part over a private network; receiving, at the metering device, a first certificate from a cloud server; validating the first certificate, by operation of the metering device, wherein the validating results in a first authentication factor; sending, from the metering device to the cloud server, a second certificate associated with a second authentication factor; sending, by operation of the metering device, a challenge request to the cloud server; receiving, at the metering device and from the cloud server, a challenge response comprising information based on the secret from the cloud server connected to the internet; validating, by operation of the metering device, that the cloud server had possession of the secret, wherein the validating results in a third authentication factor; and responsive to success of the first, second, and third authentication factors, transmitting data generated by the metering device to the cloud server.

17. The one or more non-transitory computer-readable media of clause 16, wherein transmitting data comprises: associating the data with the random ID of the metering device.

18. The one or more non-transitory computer-readable media of clause 16, wherein receiving the challenge response comprises: receiving a hash of a string that is a time value concatenated to the secret.

19. The one or more non-transitory computer-readable media of clause 16, wherein the private network comprises an Advanced Metering Infrastructure (AMI) network.

20. The one or more non-transitory computer-readable media of clause 16, wherein the private network is used to transmit data used in at least one authentication factor, and wherein transmitting the data generated by the metering device is performed using the internet.

21. A metering device, comprising: a processor; and a memory device in communication with the processor, wherein the memory device comprises non-transitory processor-readable and processor-executable instructions that, when executed by the processor perform actions comprising: generating a random identification (ID) and a secret; transmitting to a headend device, the random ID and the secret, wherein the transmitting is performed at least in part over a private network; receiving a first certificate from a cloud server; validating the first certificate wherein the validating results in a first authentication factor; sending, from the metering device to the cloud server, a second certificate associated with a second authentication factor; sending a challenge request to the cloud server; receiving, at the metering device and from the cloud server, a challenge response comprising information based on the secret from the cloud server connected to the internet; validating that the cloud server had possession of the secret, wherein the validating results in a third authentication factor; and responsive to success of the first, second, and third authentication factors, transmitting data generated by the metering device to the cloud server.

22. The metering device of clause 21, wherein transmitting data comprises: associating the data with the random ID of the metering device.

23. The metering device of clause 21, wherein receiving the challenge response comprises: receiving a hash of a string that is a time value concatenated to the secret.

24. The metering device of clause 21, wherein the private network comprises an Advanced Metering Infrastructure (AMI) network.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The words comprise, comprises, and/or comprising, when used in this specification and/or claims specify the presence of stated features, devices, techniques, and/or components.

The words do not preclude the presence or addition of one or more other features, devices, techniques, and/or components and/or groups thereof.

The invention claimed is:

1. A method by which a metering device may establish a secure communications connection, comprising:
generating, by operation of the metering device, a random identification (ID) of the metering device, and a secret, wherein the random ID is selected to be different from a real ID of the metering device;
transmitting, by operation of the metering device, to a headend device, the random ID and the secret, wherein the transmitting is performed at least in part over a private network, wherein the random ID is sent to the headend device for use in a mapping process performed by the headend device that associates random IDs of metering devices with respective real IDs of the metering devices, and wherein the private network comprises an Advanced Metering Infrastructure (AMI) network;
receiving, at the metering device, a first certificate from a cloud server;
validating the first certificate, by operation of the metering device, wherein the validating results in a first authentication factor;
sending, from the metering device to the cloud server, a second certificate associated with a second authentication factor;
sending, by operation of the metering device, a challenge request to the cloud server;
receiving, at the metering device and from the cloud server, a challenge response comprising information based on the secret from the cloud server connected to the internet;
validating, by operation of the metering device, that the cloud server had possession of the secret, wherein the validating results in a third authentication factor; and
responsive to success of the first, second, and third authentication factors, transmitting data generated by the metering device to the cloud server, wherein the transmitting includes the random ID of the metering device.

2. The method of claim 1, wherein the challenge response comprises:
a hash of a time value concatenated to the secret; and
the time value in cleartext.

3. The method of claim 1, wherein the private network is used to transmit data used in at least one authentication factor, and wherein transmitting the data generated by the metering device is performed using the internet.

4. The method of claim 1, wherein the headend device of the private network performs actions comprising:
receiving from the metering device, by operation of the headend device, a serial number of the metering device, the random ID of the metering device, and the secret, wherein the receiving is from the private network; and
sending to the cloud server, by operation of the headend device, the serial number of the metering device, the random ID, and the secret, wherein the sending is performed over the internet.

5. The method of claim 1, wherein the cloud server connected to the internet performs actions comprising:
receiving, over the internet from the headend device, a serial number of the metering device, the random ID of the metering device, and the secret;
storing the serial number of the metering device, the random ID of the metering device, and the secret;

receiving, over the internet, the second certificate;

validating the second certificate, wherein the validating performs the second authentication factor;

receiving, over the internet, the challenge request;

sending the challenge response; and receiving the data generated by the metering device.

6. One or more non-transitory computer-readable media storing computer-executable instructions that, when executed by one or more processors, configure a metering device to perform actions comprising:

generating, by operation of the metering device, a random identification (ID) of the metering device, and a secret, wherein the random ID is selected to be different from a real ID of the metering device;

transmitting, by operation of the metering device, to a headend device, the random ID and the secret, wherein the transmitting is performed at least in part over a private network to an AMI headend device, wherein the random ID is sent for use in a mapping process performed by a cloud server that associates random IDs of metering devices with respective real IDs of the metering devices, and wherein the private network comprises an Advanced Metering Infrastructure (AMI) network;

receiving, at the metering device, a first certificate from the cloud server;

validating the first certificate, by operation of the metering device, wherein the validating results in a first authentication factor;

sending, from the metering device to the cloud server, a second certificate associated with a second authentication factor;

sending, by operation of the metering device, a challenge request to the cloud server;

receiving, at the metering device and from the cloud server, a challenge response comprising information based on the secret from the cloud server connected to the internet;

validating, by operation of the metering device, that the cloud server had possession of the secret, wherein the validating results in a third authentication factor; and responsive to success of the first, second, and third authentication factors, transmitting data generated by the metering device to the cloud server, wherein the transmitting includes the random ID of the metering device.

7. The one or more non-transitory computer-readable media of claim 6, wherein receiving the challenge response comprises:

receiving a hash of a string that is a time value concatenated to the secret.

8. The one or more non-transitory computer-readable media of claim 6, wherein the private network comprises an Advanced Metering Infrastructure (AMI) network.

9. The one or more non-transitory computer-readable media of claim 6, wherein the private network is used to transmit data used in at least one authentication factor, and wherein transmitting the data generated by the metering device is performed using the internet.

10. A metering device, comprising:

a processor; and a memory device in communication with the processor, wherein the memory device comprises non-transitory processor-readable and processor-executable instructions that, when executed by the processor perform actions comprising:

generating a random identification (ID) of the metering device and a secret, wherein the random ID is selected to be different from a real ID of the metering device;

transmitting to a headend device, the random ID and the secret, wherein the transmitting is performed at least in part over a private network to an AMI headend device, wherein the random ID is sent to a headend device for use in a mapping process performed by the headend device that associates random IDs of metering devices with respective real IDs of the metering devices, and wherein the private network comprises an Advanced Metering Infrastructure (AMI) network;

receiving a first certificate from a cloud server;

validating the first certificate wherein the validating results in a first authentication factor;

sending, from the metering device to the cloud server, a second certificate associated with a second authentication factor;

sending a challenge request to the cloud server;

receiving, at the metering device and from the cloud server, a challenge response comprising information based on the secret from the cloud server connected to the internet;

validating that the cloud server had possession of the secret, wherein the validating results in a third authentication factor; and responsive to success of the first, second, and third authentication factors, transmitting data generated by the metering device to the cloud server, wherein the transmitting includes the random ID of the metering device.

11. The metering device of claim 10, wherein receiving the challenge response comprises:

receiving a hash of a string that is a time value concatenated to the secret.

12. The metering device of claim 10, wherein the private network comprises an Advanced Metering Infrastructure (AMI) network.

* * * * *